United States Patent
Yokoyama

Patent Number: 5,985,699
Date of Patent: Nov. 16, 1999

[54] METHOD FOR DESIGNING SEMICONDUCTOR INTEGRATED CIRCUIT

[75] Inventor: Katsuhiko Yokoyama, Tokyo, Japan

[73] Assignee: NEC Corporation, Japan

[21] Appl. No.: 09/093,757

[22] Filed: Jun. 9, 1998

[30] Foreign Application Priority Data

Jun. 9, 1997 [JP] Japan ................................. 9-151260

[51] Int. Cl.[6] .................................................. H01L 21/82
[52] U.S. Cl. .......................... 438/128; 438/142; 438/381
[58] Field of Search .................................. 438/128, 142, 438/381

[56] References Cited

U.S. PATENT DOCUMENTS

| | | | |
|---|---|---|---|
| 5,512,765 | 4/1996 | Gaverick | 438/128 |
| 5,631,183 | 5/1997 | Kim et al. | 438/128 |
| 5,691,218 | 11/1997 | Colwell et al. | 438/128 |

FOREIGN PATENT DOCUMENTS

| | | |
|---|---|---|
| 448715 | 2/1992 | Japan . |
| 4180263 | 6/1992 | Japan . |
| 6295595 | 10/1994 | Japan . |
| 7335844 | 3/1995 | Japan . |
| 9289251 | 3/1997 | Japan . |
| 9153550 | 6/1997 | Japan . |

*Primary Examiner*—Kevin M. Picardat
*Assistant Examiner*—Deven Collins

[57] ABSTRACT

Cells in which clock skew or variation in transistor properties is to be suppressed are specified and inputted. Next, a method of checking unoccupied cells for arranging dummy cells is specified and inputted. Next, a step of allowing a CAD tool to recognize the unoccupied cells is carried out. In this step, a check is made over a chip so as to see an area in which the cells are not located and to recognize this area as the unoccupied cells. Then, the step of checking whether or not the unoccupied cells are present near the cells to be processed is carried out. In this step, for the cells to be processed, the unoccupied cells are checked by the specified method of checking the unoccupied cells. Then, the dummy cells are arranged in the unoccupied cells.

11 Claims, 8 Drawing Sheets

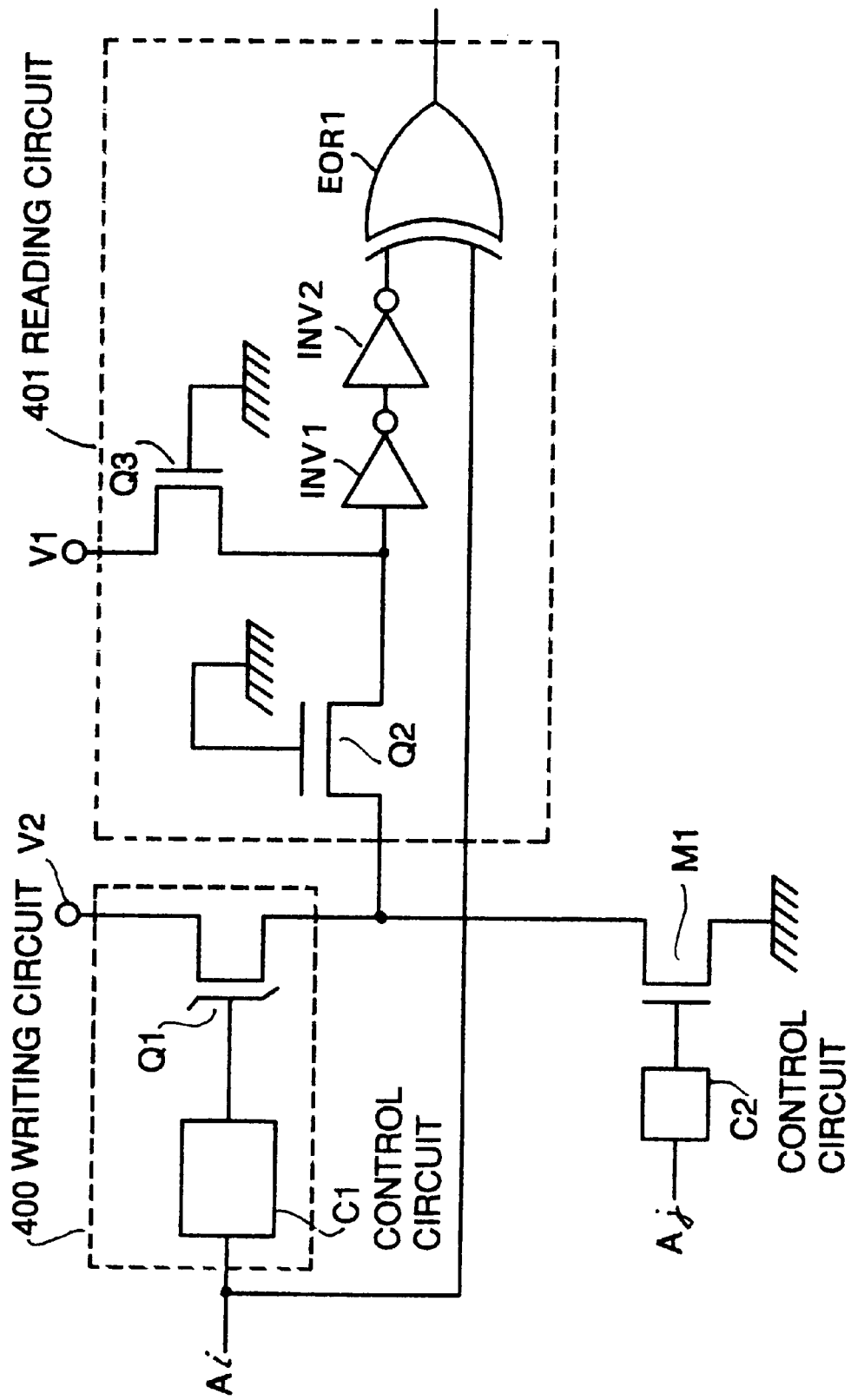

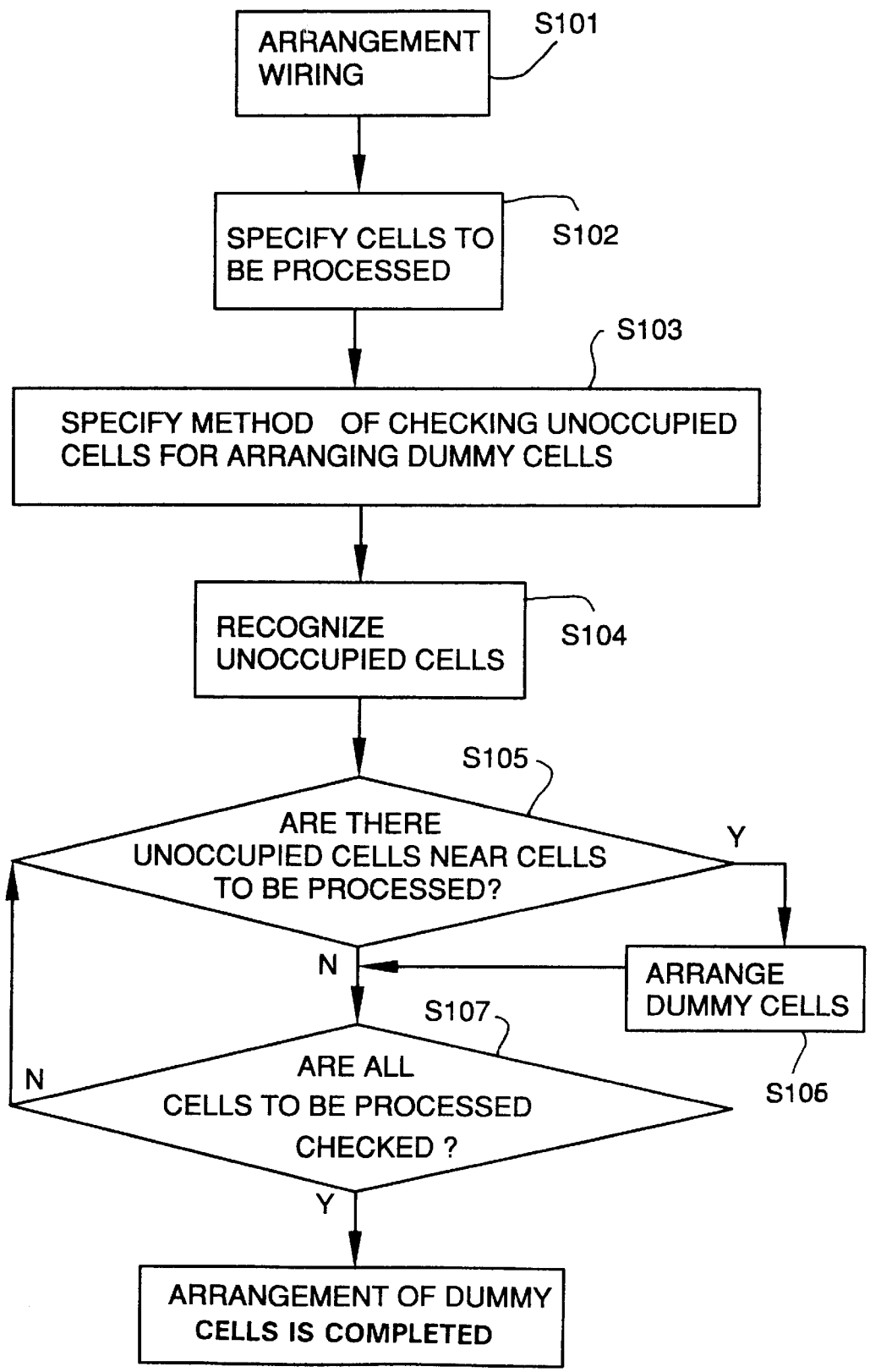

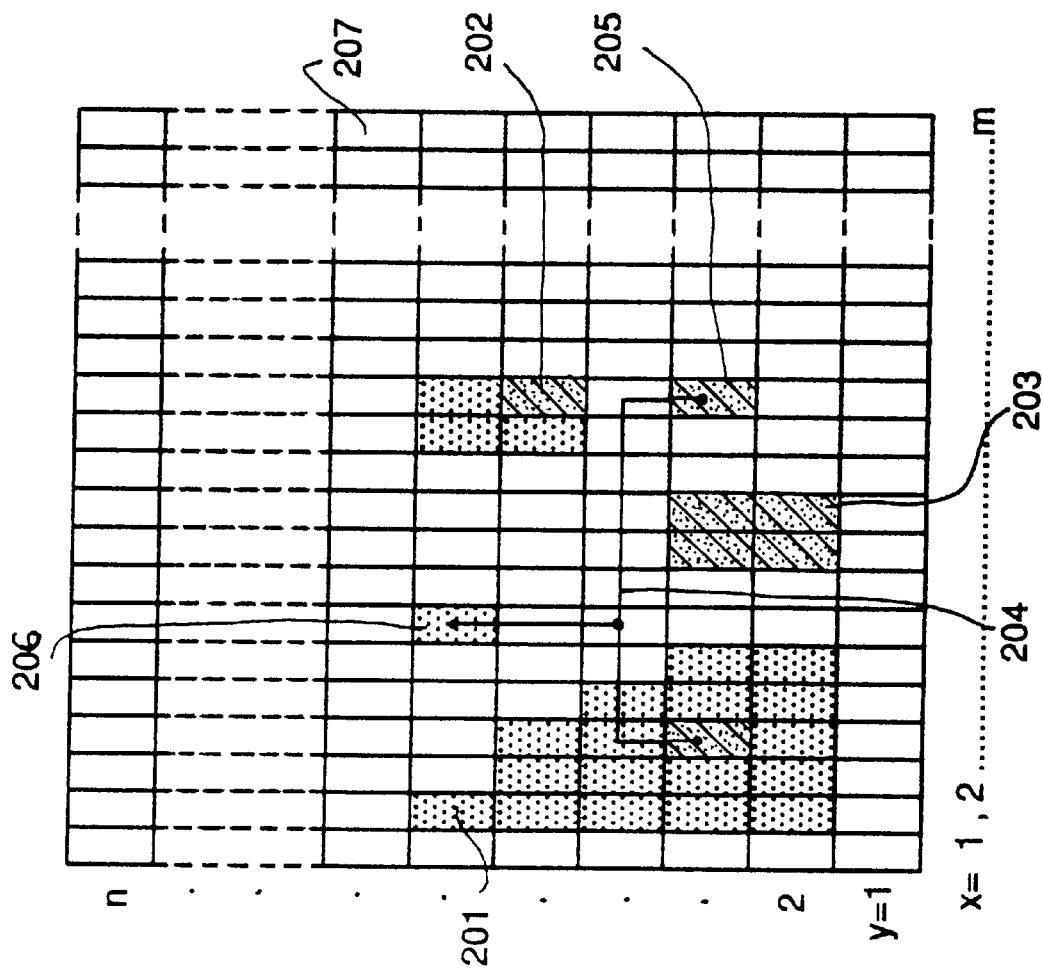

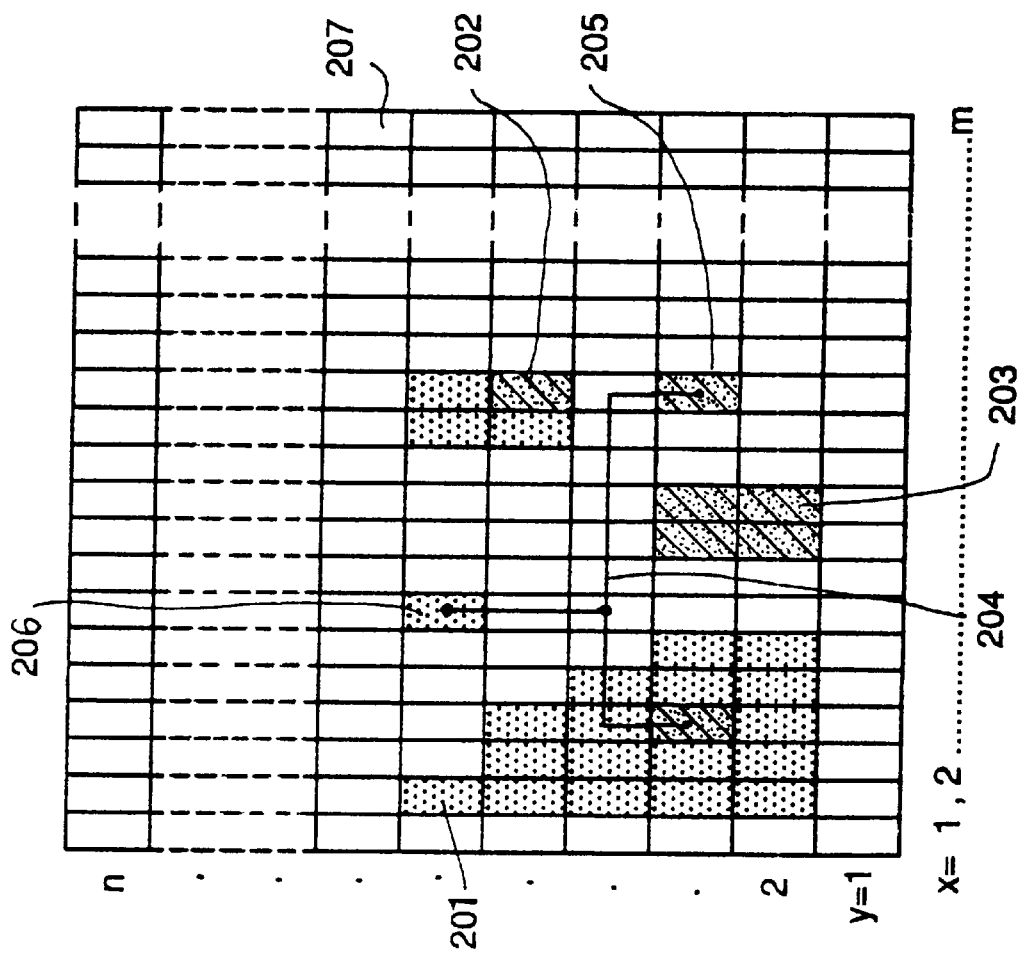

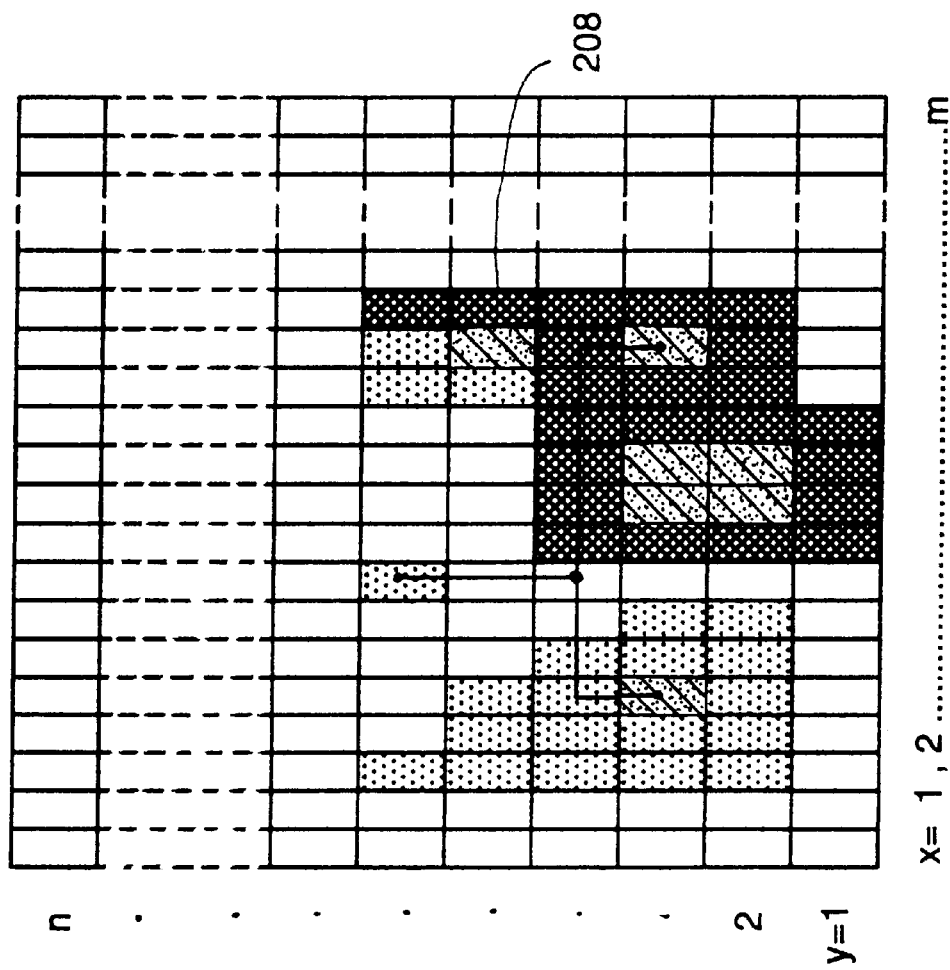

METHOD FOR DESIGNING SEMICONDUCTOR INTEGRATED CIRCUIT

BACKGROUND OF THE INVENTION

1. Field of the Invention

The present invention relates to a method for designing a semiconductor integrated circuit. More specifically, it relates to a method for designing a semiconductor integrated circuit by which variation in transistor properties is suppressed during exposure and etching by forming a dummy gate polysilicon pattern in a cell base IC.

2. Description of the Related Art

Recently, due to advances in fine pattern technology, transistor properties have been greatly affected by subtle changes in dimensions during manufacture. One of these effects has created a problem in that a gate length is varied due to a low or high density of the gate polysilicon during manufacture. This is due to the fact that the peripheral density of the gate polysilicon influences the proximity effect during exposure and the etching rate.

Although such variations in gate length has therefore been negligible because the gate length has been long relative to the variations, it has recently become impossible to ignore the variation due to a difference in the influence on the proximity effect during exposure and on the etching rate. Variation in the gate length causes variation in transistor properties, and thus clock skew is increased. An increase of clock skew requires many margins in design, thereby causing another problem in that this is disadvantageous for high-speed operation of a circuit.

As cited reference 1, FIG. 1 shows a method of manufacturing a semiconductor device disclosed in Japanese Patent Application Laid-open No. 4-48715. The exposure is performed by the use of a normal pattern and reticle 306 of a dummy pattern formed in the periphery of the pattern shown in FIG. 1(a), whereby the normal pattern is uniformly influenced by the proximity effect and thus it is possible to suppress the variation in the gate length of a resist during the exposure. Next, the exposure is performed by the use of reticle 313 for removing the dummy pattern shown in FIG. 1(b), whereby the resist of the uniform gate length of the normal pattern alone can be developed as shown in FIG. 1(c).

As cited reference 2, FIG. 2 shows the semiconductor device disclosed in Japanese Patent Application Laid-open No. 6-295595. As shown in FIG. 2(a), it can be seen that, since storage device M1 is mounted in a peripheral circuit, the density is reduced in the periphery of storage device M1. Thus, as shown in FIG. 2(b), dummy cells Mll–Mnn are arranged in the periphery of storage device M1 to thereby prevent the gate polysilicon of storage device M1 from being reduced during the exposure and the etching. That is, the variation in the gate length of a main cell and storage device M1 is suppressed.

The above-described prior art have the following problems.

In cited reference 1, another reticle and another step are additionally required for removing the dummy pattern. Furthermore, although this method can suppress the variation in gate length of the resist during exposure, since an area of a low-density resist pattern is excessively etched during the etching, the gate length of the gate polysilicon is varied.

The cited reference 2 is not applicable in the following case, that is, when it is not previously known that the area in which the cell to be processed (storage device M1) is arranged has low density, or when it is not possible to ensure that the area in which all of $n^2$ dummy cells Mll–Mnn are arranged in a matrix is located at the periphery of the cell to be processed. Moreover, when a cell to be processed has an intermediate density between low and high densities, the dummy cells are not arranged near the cell to be processed, and thus disadvantageous variations result.

SUMMARY OF THE INVENTION

In view of the problems of the above-mentioned prior arts, it is an object of the present invention to provide a method for designing a semiconductor integrated circuit capable of reducing a variation in transistor properties and of reducing a skew.

According to the present invention, there is provided a method of designing a semiconductor integrated circuit comprising the steps of: specifying, in optional cells on a chip in a cell base IC, a plurality of cells to be processed in which variation in transistor properties in manufacture or clock skew is to be suppressed; specifying a method of checking unoccupied cells for arranging dummy cells having a dummy gate polysilicon; checking over the chip by a CAD tool so as to see an area in which the cells are not located and recognizing the unoccupied cells; checking whether or not the unoccupied cells are present near the cells to be processed by the specified method of checking unoccupied cells; and arranging the dummy cells in the unoccupied cells near the cells to be processed.

Therefore, for a plurality of cells to be processed in which the variation in transistor properties in manufacture is to be suppressed in optional cells on the chip in the cell base IC, by checking whether or not the unoccupied cells are present in the periphery of a plurality of cells to be processed and then by locating the dummy cells having the dummy gate polysilicon in the unoccupied cells, variation in transistor properties can be suppressed.

BRIEF DESCRIPTION OF THE DRAWINGS

For a more complete understanding of the present invention and the advantages thereof, reference is now made to the following description taken in conjunction with the accompanying drawings, in which;

FIGS. 2(a)–2(b) show the semiconductor device disclosed in Japanese Patent Application Laid-open No. 6-295595 of cited reference 2;

FIG. 3 is a flow chart showing the method of arranging dummy cells on CAD according to the present invention;

FIG. 4 shows a semiconductor integrated circuit according to a first embodiment of the present invention;

FIG. 4(a) shows the semiconductor integrated circuit prior to the application of algorithm of the present invention;

FIG. 5 shows a semiconductor integrated circuit according to a second embodiment of the present invention;

FIG. 5(a) shows the semiconductor integrated circuit prior to the application of algorithm of the present invention; and FIG. 5(b) shows the semiconductor integrated circuit after the application of algorithm of the present invention.

DETAILED DESCRIPTION OF THE PREFERRED EMBODIMENTS

FIG. 3 shows an algorithm of a method of arranging dummy cells having a dummy gate polysilicon on a CAD.

Figure 1A:
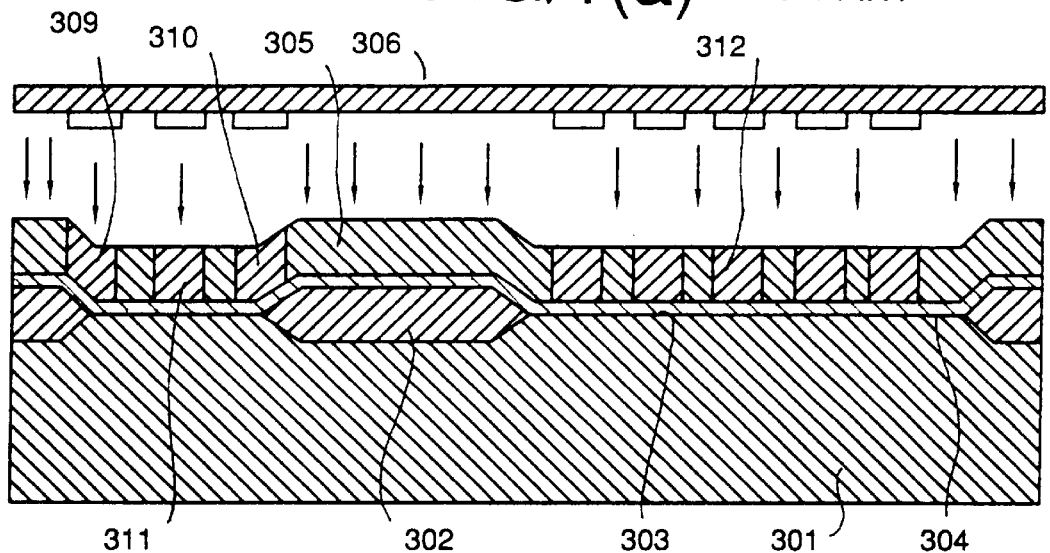
FIGS. 1(a)–1(c) show a method of manufacturing a semiconductor device disclosed in Japanese Patent Application Laid-open No. 4-48715 of cited reference 1.
Figure 1B:
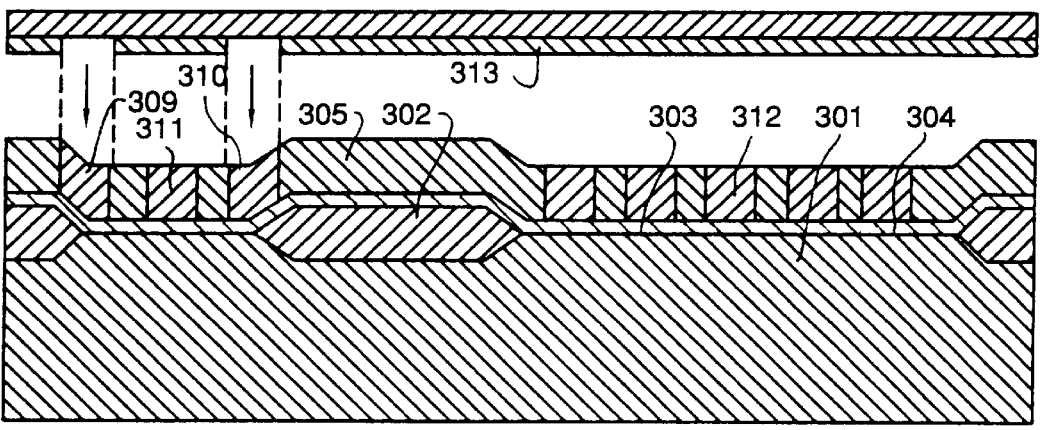
Figure 1C:
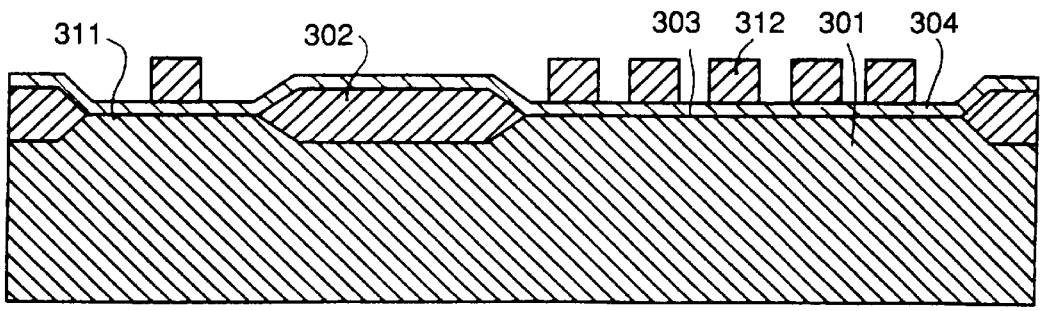
Figure 2B:
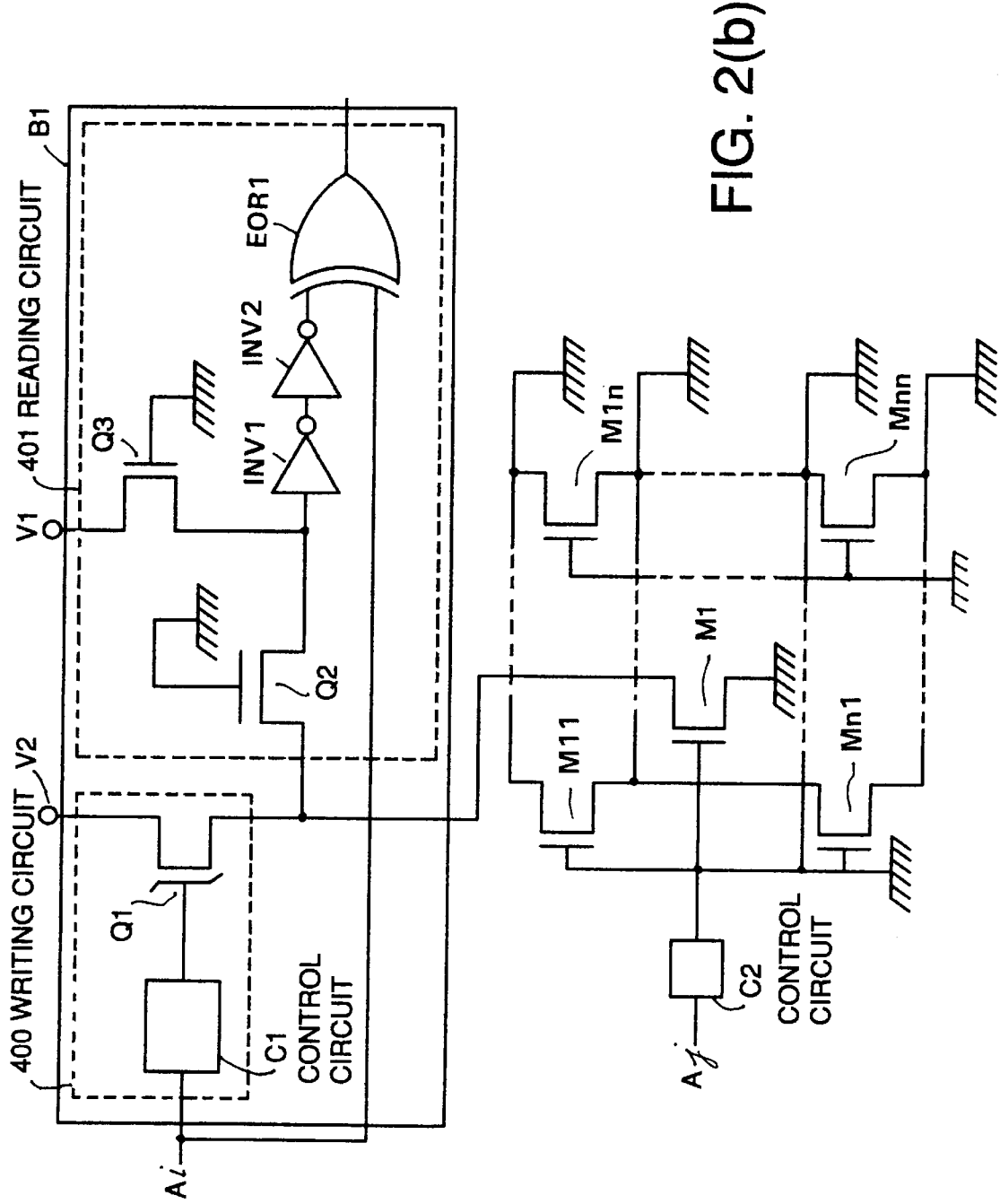
Figure 4B:
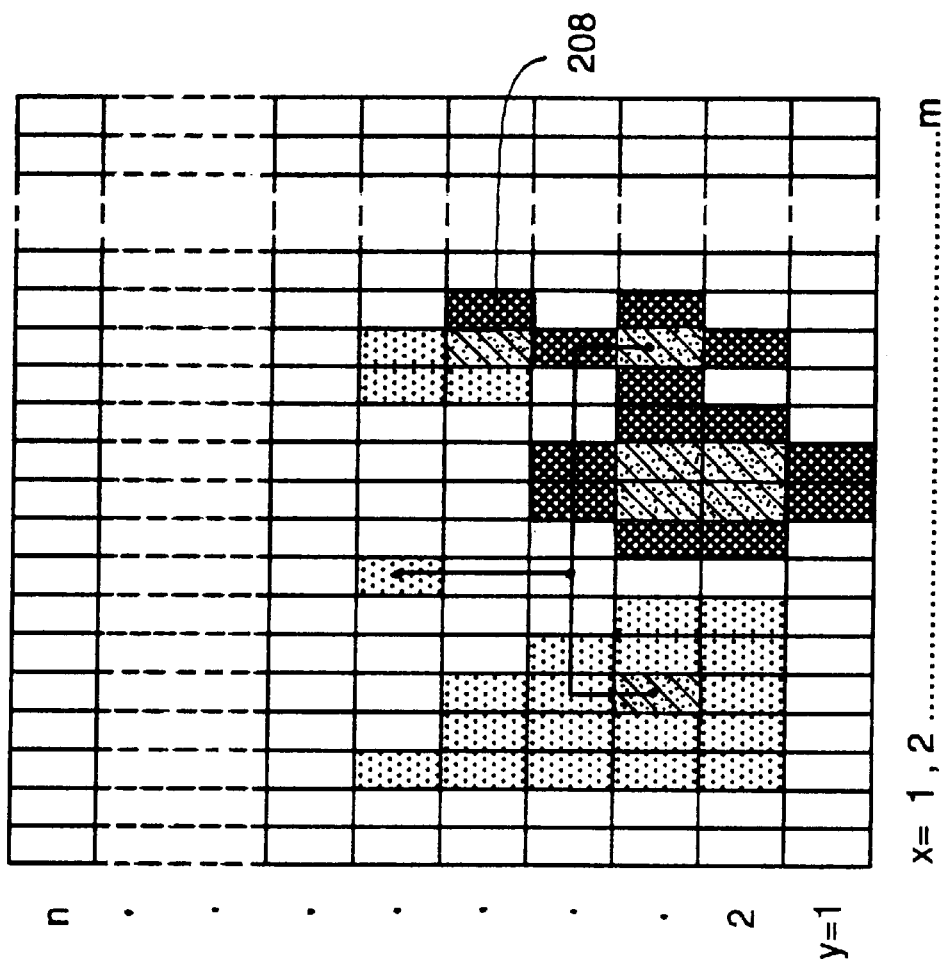
FIG. 4(b) shows the semiconductor integrated circuit after the application of algorithm of the present invention.

FIG. 4 shows a constitution of a semiconductor device of a first embodiment in which the dummy cells can be arranged in four upper, lower, left and right cells in the cells to be processed. FIG. 4(a) shows the constitution of the semiconductor device prior to the use of the algorithm. FIG. 4(b) shows the constitution of the semiconductor device (including the dummy cells) after the application of algorithm.

FIG. 4(a) shows a cell base IC in which m basic cells and n basic cells are located in the semiconductor device in X-direction and Y-direction, respectively, and the desired arrangement and wiring of the transistors have been just completed by a CAD tool. The semiconductor device comprises normal cells 201 (shown in light stippling) in which transistors are to be formed and unoccupied cells 207 (shown as white or empty cells). Cells 202, 203 and 205, in which clock skew is to be suppressed, are shown in dark stipple. Dummy cells cannot be formed where the normal cells 201 are located. Dummy cells are generated in the periphery of and cells 202, 203, 205 in which a clock skew is to be suppressed (except where a normal cell 208 is located). Cell 202 is the same as the basic cell in size, while cell 203 is integral-number times the basic cell in size. At the time of specifying the cell in which the clock skew is to be suppressed (e.g., cells 202, 203 and 205), net 204 can be also specified so as to thereby specify cell 205 in which this net is connected to an input terminal. The cell in which this net is connected to an output terminal is normal cell 206. When the algorithm of the present invention is applied to such a semiconductor device, the dummy cells 208 are generated as shown in cross-hatching in FIG. 4(b).

The algorithm for the method of arranging the dummy cells of the present invention will be described below. After step S101 (FIG. 3) of defining an arrangement/wiring on the CAD, the cells in which the clock skew or the variation in transistor properties is to be suppressed, is specified in step S102. Any cells on the semiconductor device can be specified.

Next, the method of checking the unoccupied cells (white cells in FIG. 4(a) for arranging the dummy cells is carried out in step S103.

Subsequently, step S104 of allowing the CAD tool to recognize the unoccupied cells is carried out. An area in which the cells are not located is checked over a chip so as to recognize this area as the unoccupied cells.

Then, step S105 of checking whether or not the unoccupied cells are located near the cells to be processed is carried out. In this step, for the cells to be processed, the unoccupied cells are checked by the method of checking the unoccupied cells specified in step S103. Step S106 of arranging the dummy cells in the unoccupied cells is then carried out. Since the area in which the dummy cells are arranged is no longer the area in which the unoccupied cells are present, the CAD tool recognizes that this area is not the area in which the unoccupied cells are present.

In step S107 of checking whether or not steps S105 through S106 are carried out for all the cells to be processed, if the arrangement of the dummy cells of all the cells to be processed is not completed, steps S105 through S106 are repetitively carried out. When steps S105 through S106 are carried out for all the cells to be processed, the dummy cells can be located in the unoccupied cells near all the cells to be processed, and the arrangement of the dummy cells is finally completed.

In the above-described manner, a plurality of cells to be processed are selectively specified in the optional cells on the chip, whereby a density can be wholly uniform near the cells to be processed. Thus, all the cells to be processed are influenced by the same proximity effect and etching, and therefore the device can be manufactured so that the gate length of all the cells to be processed may be uniform.

FIG. 5 shows the constitution of the semiconductor device of a second embodiment in which the dummy cells can be arranged in eight cells in the periphery of the cells to be processed. FIG. 5(a) shows the constitution prior to the application of the algorithm. FIG. 5(b) shows the constitution after the application of the algorithm.

As described above, the present invention has the following effect. That is, the optional cells on the chip can be selectively specified as the cells to be processed. Therefore, the device can be manufactured so that the gate length of all the cells to be processed may be uniform. Thus, it is possible to reduce the variation in transistor properties and to reduce the clock skew.

Furthermore, since, after the normal cells is arranged, the dummy cells are then arranged in the unoccupied areas, a reticle for removing the gate polysilicon generating the dummy cells is not required.

Although preferred embodiments of the present invention has been described in detail, it should be understood that various changes, substitutions and alternations can be made therein without departing from spirit and scope of the inventions as defined by the appended claims.

What is claimed is:

1. A method of designing a semiconductor integrated circuit, comprising the steps of:

specifying, in optional cells on a chip in a cells base IC, a plurality of cells to be processed in which variation in transistor properties in manufacture or clock skew is to be suppressed;

specifying a method of checking unoccupied cells for arranging dummy cells having a dummy gate polysilicon;

checking over said chip by a CAD tool so as to see an area in which said cells are not located and recognizing said unoccupied cells;

checking whether or not said unoccupied cells are present near said cells to be processed by said specified method of checking unoccupied cells; and arranging said dummy cells in said unoccupied cells near said cells to be processed.

2. A method of modifying a base design of a semiconductor integrated circuit, said base design having a plurality of cells, some of which contain transistors and others of which are unoccupied, said modifying method comprising the steps of:

selecting cells in said plurality of cells in which variations of transistor properties or clock skew of transistors located in those cells are to be suppressed;

selecting a method of determining which of said cells in said plurality of cells is unoccupied;

determining which of said cells are unoccupied using said selected method;

identifying unoccupied cells which are located near said selected cells; and arranging dummy cells having a dummy gate polysilicon in said unoccupied cells which are located near said selected cells.

3. The method of claim 2, wherein said step of identifying unoccupied cells which are located near said selected cells identifies unoccupied cells which are adjacent said selected cells.

4. The method of claim 2, wherein said selected cells are selected by a human operator.

5. The method of claim 2, wherein said selected method is carried out by a machine.

6. The method of claim 5, wherein said machine is a computer aided design tool.

7. The method of claim 2, wherein said plurality of cells are arranged in a matrix.

8. The method of claim 3, wherein said plurality of cells are arranged in a matrix.

9. The method of claim 4, wherein said plurality of cells are arranged in a matrix.

10. The method of claim 5, wherein said plurality of cells are arranged in a matrix.

11. The method of claim 6, wherein said plurality of cells are arranged in a matrix.

* * * * *